United States Patent [19]

Murphy et al.

[11] Patent Number: 5,294,350
[45] Date of Patent: Mar. 15, 1994

[54] MAGNETIC PARTICLE SEPARATOR

[75] Inventors: Richard J. Murphy, Elma, N.Y.; Anthony J. Marlow, St. Catherines, Canada

[73] Assignees: General Motors Corporation, Detroit, Mich.; General Motors of Canada Limited, Oshawa, Canada

[21] Appl. No.: 42,186

[22] Filed: Apr. 2, 1993

[51] Int. Cl.$^5$ .................. B01D 35/06; F01M 1/10
[52] U.S. Cl. .................. 210/168; 210/171; 210/222; 184/6.25; 74/467; 74/607
[58] Field of Search ............ 210/168, 171, 222; 184/6.25; 335/305; 74/467, 607

[56] References Cited

U.S. PATENT DOCUMENTS

| | | | |
|---|---|---|---|
| 1,944,208 | 1/1934 | Bock | 209/215 |
| 4,773,995 | 9/1988 | Kondo | 210/222 |
| 4,839,044 | 6/1989 | Tomita | 210/222 |
| 4,857,188 | 8/1989 | Aisa et al. | 210/222 |

Primary Examiner—Matthew O. Savage
Attorney, Agent, or Firm—Saul Schwartz

[57] ABSTRACT

A magnetic particle separator for a motor vehicle drive axle includes a slot in a wall of the drive axle and a magnet in the slot. The slot is located such that one side thereof defines a window open to a gear chamber of the drive axle. The slot has dovetail edges which define abutments for preventing dislodgement of the magnet into the gear chamber through the window. A cover of the drive axle closes and open side of the gear chamber and an open end of the slot to prevent dislodgement of the magnet through the open end. Ferromagnetic particles entrained in fluid lubricant circulating in the gear chamber are attracted by the magnet through the window and thereby separated from the lubricant.

5 Claims, 1 Drawing Sheet

MAGNETIC PARTICLE SEPARATOR

FIELD OF THE INVENTION

This invention relates to drive axles for motor vehicles.

BACKGROUND OF THE INVENTION

Motor vehicle drive axles for front wheel drive and rear wheel drive typically include a housing having a gear chamber for a differential gear set of the drive axle. Tiny steel particles dislodged from the meshing gears of the differential gear set during normal operation become entrained in the lubricating fluid circulating in the gear chamber. To maximize the durability of the differential, magnets for capturing the dislodged particles have been mounted on fill/drain plugs in the drive axle housing, which plugs may or may not be located for maximum particle collection. Alternatively, magnets have been glued or otherwise adhesively affixed to a side of the gear chamber. Such adhesively affixed magnets may be prone to dislodgement and the adhesives may be difficult to handle and apply. A magnetic particle separator according to this invention is an improvement over the aforesaid plug and adhesive mount magnetic particle separators.

SUMMARY OF THE INVENTION

This invention is a new and improved magnetic particle separator for a motor vehicle drive axle of the type having a housing, a gear chamber in the housing, a differential in the gear chamber, and a cover bolted to the housing closing an open side of the gear chamber. The magnetic particle separator according to this invention includes a slot located in a wall of the housing such that a side of the slot defines a window exposed to the gear chamber. The separator further includes a magnet inserted through an open end of the slot and seated behind the window. The sides of the slot are dovetailed and overlap the magnet to define abutments which prevent dislodgement of the magnet through the window. The open end of the slot is located in relation to the open side of the gear chamber such that the cover blocks dislodgement of the magnet through the open end when the cover is mounted on the drive axle housing. In a preferred embodiment, the magnet slot opens through a seal surface on the drive axle housing against which the cover seats. As fluid lubricant circulates in the gear chamber, steel particles entrained in the lubricant are attracted to the magnet through the window and thereby separated from the lubricant.

DESCRIPTION OF A PREFERRED EMBODIMENT

Figure 1:
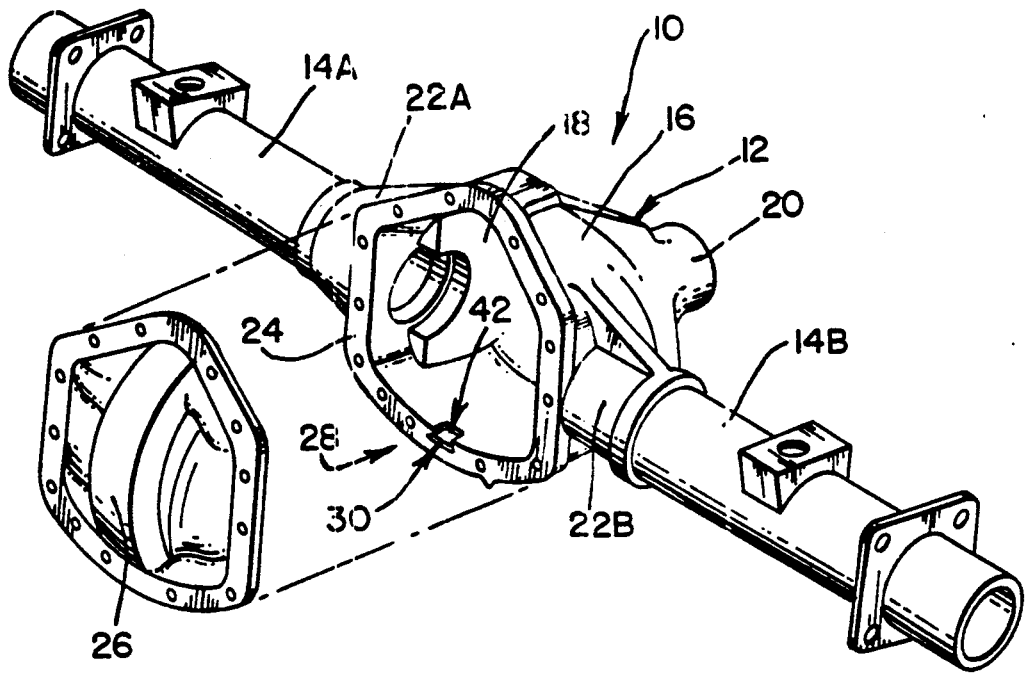
FIG. 1 is a fragmentary perspective view of motor vehicle drive axle having a magnetic particle separator according to this invention.
Figure 2:
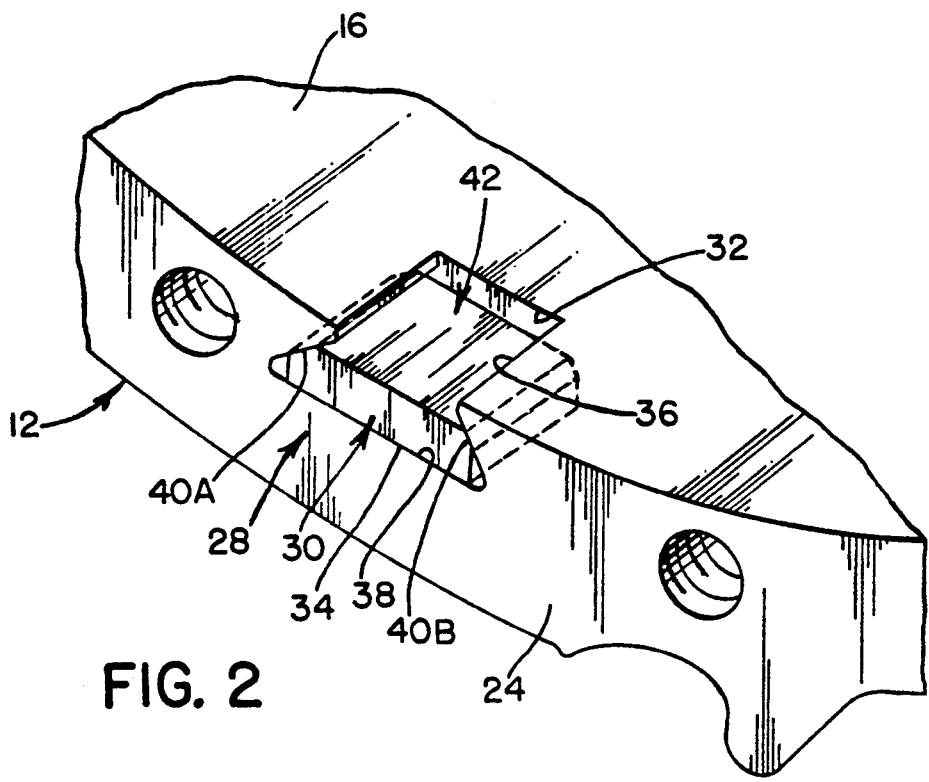
FIG. 2 is a fragmentary perspective view of a portion of FIG. 1.

Referring to the drawings, a representative drive axle housing 10 of a conventional rear wheel drive for a motor vehicle, not shown, includes a differential housing 12 and a pair of axle tubes 14A-B. The differential housing is preferably a nonferromagnetic metal casting and includes a wall 16 defining a gear chamber 18 of the housing. The wall 16 defines a pinion nose 20 of the differential housing and pair of tubular sockets 22A-B on opposite sides of the housing 12 for reception of respective ones of the tubes 14A-B.

The gear chamber 18 is open on the side of the housing 12 opposite the pinion nose for installation of a conventional differential gear set, not shown. The open side of the gear chamber is surrounded by a seal surface 24 of the wall 16 of the housing 12. A gasketed cover 26 of the drive axle seats against the seal surface 24 to close the gear chamber 18 and is attached to the wall 16 by bolts.

The differential gear set in the gear chamber divides torque in the usual way between a pinion gear, not shown, rotatably supported in the pinion nose 20 and a pair of axle shafts, not shown, in the tubes 14A-B. The gear chamber 18 is partially filled with fluid lubricant, e.g. oil, to lubricate the gears of the differential gear set. A magnetic particle separator 28 according to this invention on the differential housing 12 captures ferromagnetic particles dislodged from the gears of the differential gear set and entrained in the oil. While the magnetic particle separator 28 according to this invention is described below in the environment of the drive axle 10, front wheel drive, four wheel drive, and other drive axle configurations are contemplated.

The magnetic particle separator 28 includes a slot 30 in the wall 16 of the differential housing situated generally at the lowermost extremity of the housing. The slot 30 has a closed inboard end 32 and an open outboard end 34 in the seal surface 24 of the wall 16. The slot 30 borders the gear chamber 18 such that a side of the slot defines a generally rectangular window 36 through which the slot is open to the gear chamber. The slot 30 has a bottom 38 behind the window 36 and a pair of dovetail sides 40A-B extending between the inboard and outboard ends 32, 38 and defining abutments on opposite sides of the window 36. Preferably, the slot 30 is cast directly into the wall 16 to minimize machining to the differential housing 12.

A flat bar magnet 42 of the separator 28 is disposed in the slot 30 behind the window 36. The width dimension of the magnet 42 exceeds the corresponding dimension of the window 36 so that the abutments defined by the dovetail sides 40A-B of the slot 30 prevent dislodgement of the magnet through the window. The cover 26, in its attached position on the housing 12 seated against the seal surface 24, closes the open end 34 of the slot 30 and prevents dislodgement of the magnet through the open end.

When the vehicle is standing still, fluid lubricant in the gear chamber pools over the window 36 and ferromagnetic particles in the fluid migrate by gravity and by magnetic attraction through the window for permanent capture by the magnet 42. When the vehicle is moving, the gears of the differential gear set continuously sling fluid lubricant from the pool over the window 36 to the extremities of the gear chamber, from which it drains by gravity back to the pool. During this circulation, the magnet 42 continues to attract and permanently capture ferromagnetic particles from the film of lubricant continuously circulating over the window.

Formation of the slot 30 and assembly and retention of the magnet 42 are important features of this invention. That is, the slot may be formed by adding a relatively simple appendage to the mold in which the differential housing 12 is cast so that no additional machining of the differential housing is necessary. During final assembly of the drive axle, before the cover 26 is attached to the differential housing, the magnet 42 is simply inserted in the slot 30 through the open end 34 thereof and seated against the inboard end 32 behind the window 36. When the cover 26 is thereafter attached in the usual fashion, the magnet is automatically and permanently trapped without any additional fastening requirement.

The embodiments of the invention in which an exclusive property or privilege is claimed are defined as follows:

1. In a vehicle drive axle including a wall made of non-ferromagnetic material defining a gear chamber of said drive axle having an open side surrounded by a seal surface of said wall, and
   a cover having an attached position on said drive axle seated against said seal surface and closing said open side of said gear chamber,
   a magnetic particle separator comprising:
   means defining a slot in said drive axle wall having a closed inboard end and an open outboard end and located relative to said gear chamber such that a side of said slot defines a window open to said gear chamber,
   a magnet inserted in said slot through said open end thereof and disposed behind said window operative to attract through said window ferromagnetic particles entrained in fluid lubricant in said gear chamber,
   abutment means operative to prevent dislodgement of said magnet into said gear chamber through said window, and
   means on said cover for preventing dislodgement of said magnet from said slot through said open outboard end thereof in said attached position of said cover on said drive axle.

2. The magnetic particle separator recited in claim 1 wherein,
   said wall of said drive axle housing is made of cast non-ferromagnetic material, and
   said slot is formed integrally with said wall when said wall is cast.

3. The magnetic particle separator recited in claim 2 wherein,
   said slot is located generally at a lowermost extremity of said gear chamber.

4. The magnetic particle separator recited in claim 3 wherein,
   said abutment means includes means defining a pair of dovetail sides of said slot extending between said inboard and said outboard ends thereof.

5. The magnetic particle separator recited in claim 4 wherein,
   said open outboard end of said slot is located in said seal surface of said wall of said drive axle.

* * * * *